(12) United States Patent
Ramberg (10) Patent No.: US 12,512,623 B2
(45) Date of Patent: Dec. 30, 2025

(54) POWER PLUG DISCONNECTION DEVICE AND ASSEMBLY

(71) Applicant: RELEZ AB, Vänersborg (SE)

(72) Inventor: Stefan Ramberg, Vänersborg (SE)

(73) Assignee: RELEZ AB, Vänersborg (SE)

( * ) Notice: Subject to any disclaimer, the term of this patent is extended or adjusted under 35 U.S.C. 154(b) by 282 days.

(21) Appl. No.: 18/273,919

(22) PCT Filed: Feb. 2, 2022

(86) PCT No.: PCT/SE2022/050115
§ 371 (c)(1),
(2) Date: Jul. 24, 2023

(87) PCT Pub. No.: WO2022/169396
PCT Pub. Date: Aug. 11, 2022

(65) Prior Publication Data
US 2024/0380163 A1    Nov. 14, 2024

(30) Foreign Application Priority Data

Feb. 4, 2021 (SE) .................................... 2130035-5
May 18, 2021 (SE) .................................... 2130133-8

(51) Int. Cl.
H01R 13/635        (2006.01)

(52) U.S. Cl.
CPC .................................. *H01R 13/635* (2013.01)

(58) Field of Classification Search
CPC ..... H01R 13/635; H01R 13/58; H01R 13/633
(Continued)

(56) References Cited

U.S. PATENT DOCUMENTS 4,605,271 A  *  8/1986  Burns ................ H01R 13/6276
                                                           439/348
5,266,040 A     11/1993  Merrill et al.
(Continued)

FOREIGN PATENT DOCUMENTS

DE        19513170 A1    10/1996
DE    102004011519 B3     9/2005
(Continued)

OTHER PUBLICATIONS

RELEZ AB, International Patent Application No. PCT/SE2022/050115, International Search Report, Mar. 4, 2022.
(Continued)

*Primary Examiner* — Tulsidas C Patel
(74) *Attorney, Agent, or Firm* — Moore & Van Allen PLLC; W. Kevin Ransom (57) ABSTRACT

A power plug disconnection device comprising a two-piece shell connectable in surrounding relation about a pusher member which is adapted for accommodation of electrical contact elements. The pusher is journaled in the shell for axial movement between a spring-biased withdrawn position in the shell to a spring-driven position partially expelled from the shell upon release of the spring force. A lock- and release mechanism is in locked condition arranged to hold the pusher in the spring-biased position and in unlocked condition arranged to release the spring force for expelling the pusher. The lock- and release mechanism engages the free end of a lever which is journaled on a pivot in the shell for lever action, the opposite end of the lever carrying a cog wheel in geared engagement with a cog rack arranged in the exterior of the pusher.

23 Claims, 4 Drawing Sheets

(58) Field of Classification Search
USPC .................................................. 439/159, 160
See application file for complete search history.

(56) References Cited

U.S. PATENT DOCUMENTS

| | | | |
|---|---|---|---|
| 5,480,313 A | 1/1996 | D Alayer de Costemore D Arc | |
| 2015/0194763 A1 | 7/2015 | Gagne et al. | |
| 2015/0364853 A1* | 12/2015 | Thijssen ................ | F21S 8/061 439/660 |
| 2023/0327371 A1* | 10/2023 | Griepenstroh .......... | C08L 63/00 439/125 |

FOREIGN PATENT DOCUMENTS

| | | |
|---|---|---|
| EP | 586359 A1 | 3/1994 |
| RU | 2492561 C1 | 9/2013 |
| WO | 2010107339 A1 | 9/2010 |

OTHER PUBLICATIONS

RELEZ AB, International Patent Application No. PCT/SE2022/050115, Written Opinion, Mar. 4, 2022.

* cited by examiner

POWER PLUG DISCONNECTION DEVICE AND ASSEMBLY

CROSS-REFERENCE TO RELATED APPLICATIONS

This application is a National Stage Patent Application (filed under 35 § U.S.C. 371) of PCT/SE2022/050115, filed Feb. 2, 2022, of the same title, which, in turn claims priority to Swedish Patent Application No. 2130035-5 filed Feb. 4, 2021, and Swedish Patent Application No. 2130133-8 filed May 18, 2021; the contents of each of which are hereby incorporated by reference.

TECHNICAL FIELD OF THE INVENTION

The present invention relates to a disconnection device arranged for protection of a power plug and socket from damages caused upon disconnecting the power plug from the socket by unintentional pulling on the power cable. The invention also relates to a power plug and power plug disconnection assembly incorporating the disconnection device.

BACKGROUND AND PRIOR ART

In connection with electrical pre-heating of motors, fuel and passenger compartments in vehicles, as well as in recharging of vehicle batteries, it may occasionally happen that the vehicle is made to run off while the vehicle is still connected to the power supply. Eventually, the power cable becomes tensioned and the power plug is abruptly ripped away from its socket in the vehicle or in a building/charging post. The unintentional and improper disconnection of the power plug is likely to damage the power cable, plug or socket.

One previous solution to this problem is provided by a self-ejecting plug and socket combination manufactured and sold by MELTRIC (US). A spring-loaded ejection ring is built into the socket to act towards the front of the plug upon release of a latching pawl. In other words, the power plug is spring biased away from the socket in connected mode. A release cord is in one end attached to the latching pawl and in the other end anchored to the power cable in such manner that the power cable remains in slacked condition while the release cord is tensioned.

Although efficient and reliable, the ejection mechanism in the self-ejecting plug and socket combination from MELT-RIC takes up building space in the plug and socket housings, leading to dimensions that may seem exaggerated in some applications.

Other examples of power plugs with ejection means integrated in the plug can be found in US20150194763 (A1) and in DE102004011519 (B3), e.g.

SUMMARY OF THE INVENTION

It is an object of the present invention to provide a power plug disconnection device which does not require redesign of the internals of an existing power plug or socket.

It is another object of the present invention to provide a power plug disconnection device which is adapted, within limits, for use with power plugs of different lengths and widths.

It is still another object of the present invention to provide a power plug disconnection device which can be shifted from one power plug to another.

It is yet another object of the present invention to provide a power plug and power plug disconnection assembly which guarantees the advantages provided by the embodiments of the disconnection device.

One or some of these objects will be met by a disconnection device comprising a two-piece shell reaching from a forward end in use facing a proximal direction, to a rear end in use facing a distal direction. The shell pieces are mutually connectable in surrounding relation about a pusher which is adapted for accommodation of electrical contact elements. The pusher is journaled in the shell and axially movable between a withdrawn position in the shell wherein the pusher is acted upon by the biasing force of a compressed spring, to a spring-driven position partially expelled in the proximal direction past the forward end, or in the distal direction past the rear end of the shell upon release of the spring. A lock- and release mechanism is arranged in locked condition for holding the pusher in the spring-biased position and in unlocked condition arranged to release the spring for expelling of the pusher. The lock- and release mechanism engages a free end of a lever which in its opposite end is journaled on a pivot in the shell for lever action, said opposite end of the lever carrying a cog wheel in geared engagement with a cog rack arranged in the exterior of the pusher.

A technical effect and advantage provided by the solution is that the lever action permits a comparatively large spring force to be manually charged and subsequently released upon unintentional disconnection of electric contact components in a power plug and socket connection.

In one embodiment the pusher is a hollow cylinder arranged for dismountable accommodation of a cylindrical power plug with internal contact components.

An advantage provided by this embodiment is that the disconnection device can be refitted onto another power plug. Another advantage provided by this embodiment is that the disconnection device can accommodate mating power plugs without modification of the power plugs. In other words, the disconnection device can be adapted for operation with existing power plugs of cylindrical design.

In one embodiment the pusher is arranged for stationary mounting of a power plug or of electric contact components within the pusher. In yet one embodiment, the electric contact components can be embedded in the pusher. In other words, the pusher can itself form a power plug with internal contact components, if appropriate.

An advantage and technical effect provided by the later embodiment is a non-complex and lightweight design.

In one embodiment, the pusher is arranged to be withdrawn into the shell for a length sufficient to ensure that a buffer space is established in the shell, in front of the pusher.

A technical effect provided by this embodiment is that electrical discharge between the electric contact components of the pusher and corresponding components of a mating power socket can be avoided upon disconnection.

In a second aspect of the invention, a power plug and disconnection device assembly is provided, comprising a power plug and a power plug disconnection device wherein the pusher is a hollow cylinder and the power plug has a straight cylinder portion in a forward end of the power plug, the diameters of which are adapted for sliding the pusher over the cylinder portion upon unintentional release of the power plug.

More embodiments and advantages provided by the invention will appear from subordinate claims and from the detailed description below.

A bending restriction means can be arranged about power conductors in the rear end of a power plug. The bending restriction means may comprise a range of radially extended, internally distanced discs, whereby a shell anchoring means, formed in the shell or connectable thereto, comprises one or more teeth engaging between adjacent discs.

SHORT DESCRIPTION OF DRAWINGS

Embodiments of the invention will be explained below with reference made to the accompanying schematic drawings. In the drawings.

DETAILED DESCRIPTION OF PREFERRED EMBODIMENTS

Figure 1:
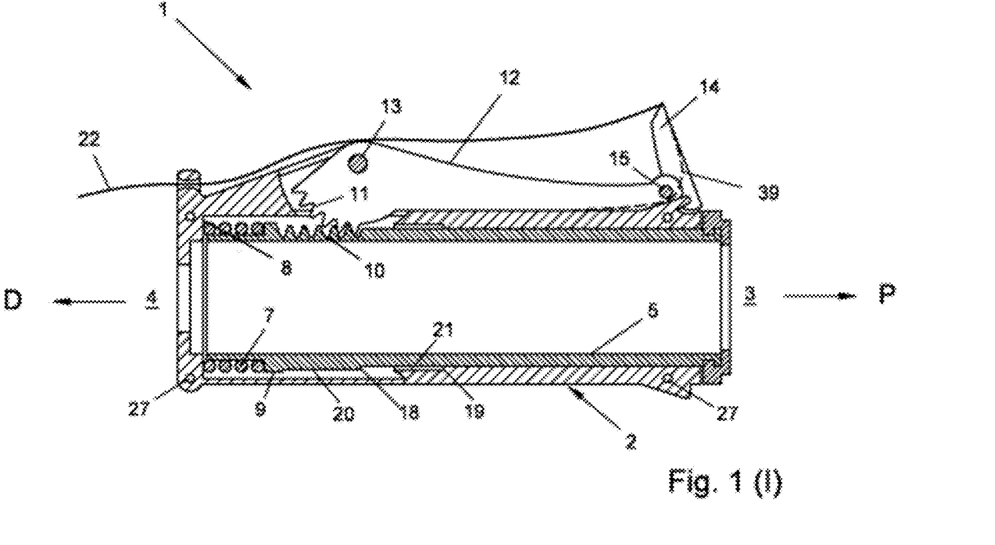
FIG. 1 is a longitudinal sectional view showing a first embodiment of the disconnection device in spring biased mode (I), charged for release.
Figure 2:
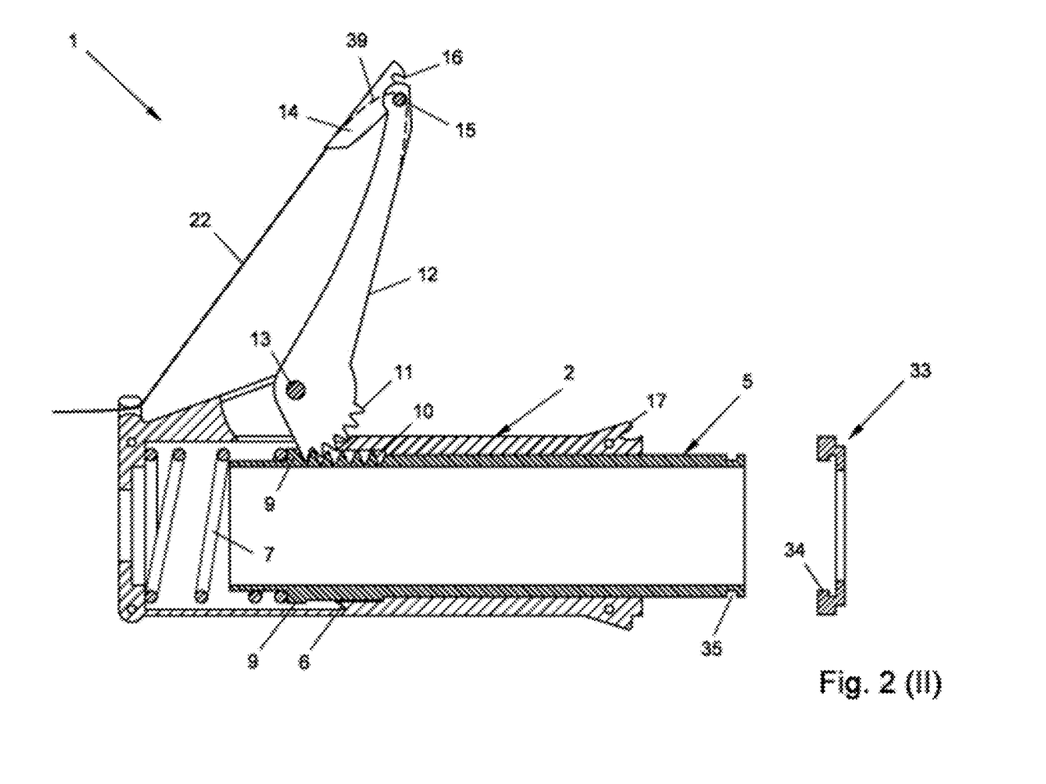
FIG. 2 is a corresponding sectional view showing the disconnection device of FIG. 1 in released mode (II)

With reference to the drawings, a power plug disconnection device 1 comprises a two-piece shell 2, only one piece (2) of which is illustrated in the drawings whereas the shell member closest to the viewer is removed to show the internals of the disconnection device. The shell 2 reaches in longitudinal direction from a forward end 3 facing the proximal direction P, in operation facing towards a socket (not shown) for a power plug (see FIG. 3), to a rear end 4 opposite to the forward end and facing the distal direction D. Within the shell 2, a hollow pusher member 5 is journaled for movement longitudinally upon release of a spring force as will be explained below. The pusher 5, in this embodiment opens in both its ends, may be journaled to slide on guides 6 running in the length direction for a jam-free motion within the shell 2. In this embodiment, the pusher 5 is a tube or cylinder, and it may have a continuous, circular sectional profile throughout its length. Similar to the shell 2, also the pusher 5 reaches from a forward end 3 facing the proximal direction P to a rear end 4 facing the distal direction D.

A coil spring 7 is arranged in the rear end of the shell to act on the pusher. The coil spring 7 may be supported in concentric relation about a rear end portion of the pusher 5, in operative position between a radial shoulder 8 formed inside the shell 2 and a radial collar 9 arranged on the exterior of the pusher 5.

In the exterior of the pusher 5, a cog rack 10 is supported and extending in the longitudinal direction. The cog rack 10 may be formed integrally in the exterior of the pusher, or may alternatively be provided as a separate element attached to the outside of the pusher.

The cog rack 10 is engaged by a cog wheel 11 formed in a first end of a lever 12 which is journaled in the shell 2 for lever action about a pivot 13. The cog wheel and cog rack are continuously in geared engagement so that the lever pivots in either direction when the pusher moves in the shell in proximal or distal direction respectively.

Upon manually lowering the lever 12 towards the shell 2, the cog wheel 11 drives the cog rack and pusher towards the rear end of the shell 2. This motion compresses the spring 7 and charges the pusher in the spring-biased position I shown in FIG. 1.

A lock- and release mechanism is arranged in the form of a latch 14 that is pivotally supported on a pivot 15 in the free second end of the lever 12. In the lowered position of the lever, a hook formation 16 in one end of the latch comes to engagement with a heel 17 formed on the exterior of the shell, this way arresting the lever and the pusher 5 in the spring-biased position I.

Upon release of the latch from the heel 17, the spring 7 expands to drive the pusher in a stroke-like motion in the proximal direction of the disconnection device. Motion limiters, such as radially extending and axially facing shoulders 18 and 19, may be formed on the shell and on the pusher respectively to halt the stroke as the pusher is expelled past the forward end of the shell for a length sufficient to disconnect a power plug from its socket.

In a similar manner, rotation limiters such as axially running surfaces or splines 20 and 21 may be formed on the shell and on the pusher respectively to ensure that the cog rack 10 is aligned with the cog wheel 11 at all times.

In the expelled position II, see FIG. 2, the lever 12 is raised from the shell by the geared engagement with the cog rack on the pusher. From this position, the disconnection device 1 can again be charged and made ready for operation by lowering the lever 12 and arresting the latch 14 onto the heel 17.

In a manner known per se, a tension cord 22 can be attached to the latch 14 in one end while the other end of the tension cord is anchored to a power cable at a position which ensures that, in the event of a pulling force being applied to the power cable, the tension cord becomes tightened while there is still a slack formed in the power cable.

Figure 4:
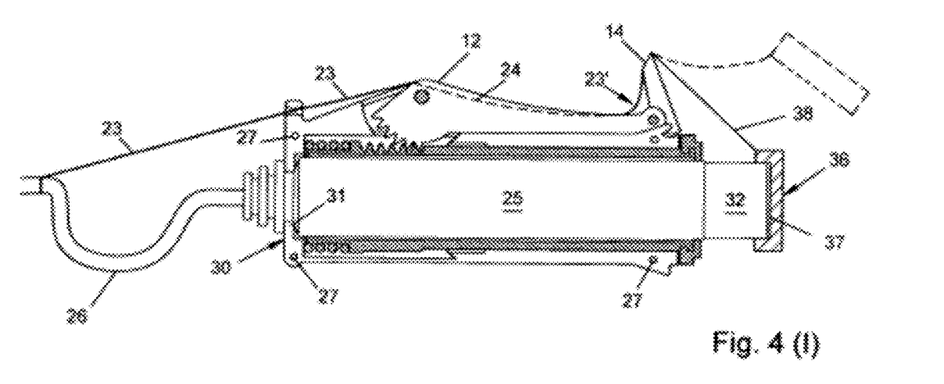
FIG. 4 shows a power plug and the disconnection device of the first embodiment in spring biased mode.
Figure 5:
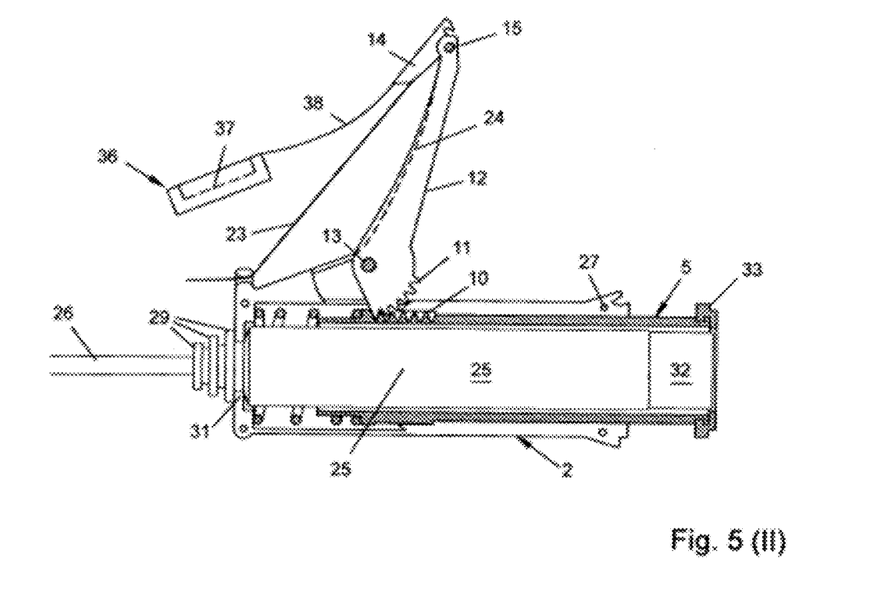
FIG. 5 shows the power plug and disconnection device of the first embodiment in released mode.

In one embodiment of the disconnection device 1, see FIGS. 4 and 5, a tension cord is formed in a stiffer material rigid enough to apply a spring action towards the latch 14. The tension cord 23 may comprise a twisted wire of about 1-1.5 mm thickness, e.g., advantageously covered by a plastic sheathing such as a PVC-tube. In combination with the rigid tension cord 23, the lever 12 is formed with an elongate recess 24 in its exterior, this way providing an elongate seat for the tension cord 23 in the spring-biased position I. The recess 24 has a width adapted for receiving the tension cord 23 under a form-fitting engagement, detachably arresting the wire being pressed into the seat, while building up spring force in a curved cord length 23' between the lever 12 and the latch 14. Thus, the tension cord 23 applies a biasing force acting between the latch 14 and the lever 12.

Figure 3:
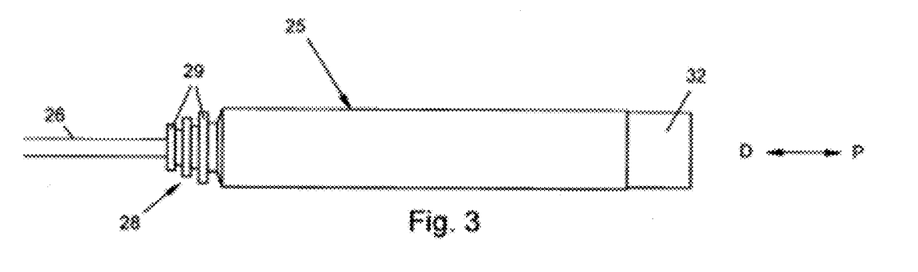
FIG. 3 shows a power plug and cable portion in elevational view.

In use, see FIGS. 3, 4 and 5, the disconnection device 1 forms part of an assembly comprising also a power plug 25 and power cable 26. Similar to the shell 2 and pusher 5, also the power plug 25 reaches from a forward end facing the proximal direction P to a rear end facing the distal direction D. To facilitate assembly, the hollow pusher 5 has an inner diameter adapted for inserting the pusher over the power plug by introducing the power plug from the rear end 4 of the pusher until a frontend portion 26 of the power plug protrudes past the forward end 3 of the pusher. Next, the shell pieces 2 are joined in surrounding relation about the pusher and the power plug, and secured such as by screws driven into screw holes 27.

In the illustrated embodiment, the disconnection device 1 is anchored in axial direction onto the power plug and cable by engagement with a bending restriction means 28 which is arranged about power conductors that are introduced in the power plug via its rear end. The bending restriction means 28 comprises a range of radially extended, internally distanced discs 29. A shell anchoring means 30 formed on the shell 2 or connectable thereto comprises one or several teeth 31, in anchored position engaging between adjacent discs 29 of the bending restriction means.

Alternatively, not shown in the drawings, a disconnection device can be anchored onto the power plug and cable by means of a screw clamp which can be tightened about the power cable. Such a screw clamp may be provided as a separate element or as a functional means that is formed integrally with the shell.

In either case, the disconnection device 1 will be anchored to the power plug and cable sufficiently to hold the force of the spring 7 upon release.

In a power plug 25 to be used with the disconnection device of the present invention, at least a frontend portion of the power plug is shaped with a straight cylindrical portion 32 adapted for insertion into a socket and power connector (not illustrated). The diameters of the hollow pusher 5 and the cylindrical portion 32 are adapted for sliding the pusher over the cylinder portion upon disconnection of the power plug from the power socket. For the purpose of bridging any difference in diameter dimension between the frontend portion 32 of the power plug and the pusher 5, a ring-shaped adapter 33 may be arranged in the forward end of the pusher, this adapter ring 33 having an inner diameter adapted for easy sliding motion along the frontend portion 32 as the pusher is expelled from the shell. The adapter ring 33 may be realized in the form of two interconnectable ring halves, or alternatively realized as a flexible element formed in a synthetic material.

Advantageously, the adapter ring 33 may be rotationally supported in the forward end of the pusher 5. To this purpose, a circumferential, radial flange 34 formed on the adapter ring is received in a corresponding circumferential recess 35 formed in the exterior of the pusher for sliding motion and relative rotation between the adapter ring and the pusher. The embodiment permits rotation of a power plug in order to mate with a socket while the shell and the pusher are maintained stationary, in spite of a formfitting relation provided between the power plug portion 32 and the adapter ring 33.

The disconnection device 1 may be provided in association with a lid 36 which is adapted for mounting onto the forward end of a power plug in the spring-biased position I. To this purpose, the lid is formed with a circular recess 37 dimensioned to be fitted on the cylindrical frontend portion 32 of the power plug. The lid 36 is anchored to the latch 14 by means of a wire 38. The wire 38 has a length which is adapted to tauten the wire and maintain the latch 14 in arrested position onto the heel 17 when the lid 36 is mounted on the power plug. In other words, the lid and the wire provide a safety function which prevents involuntary release of the device when unplugged and disconnected from a socket.

In an alternative embodiment, the disconnection device 1 comprises a spring member 39, such as a pin spring or torsion spring, which may be supported on the pivot 15 and having one leg acting on the lever 12 and the other leg acting on the latch 14, this way urging the latch towards engagement with the heel 17 in the spring-biased position I. Accordingly, similar to the rigid tension cord 23, a spring member 39 may alternatively be used to apply a biasing force acting between the latch 14 and the lever 12.

Figures 6, 7:
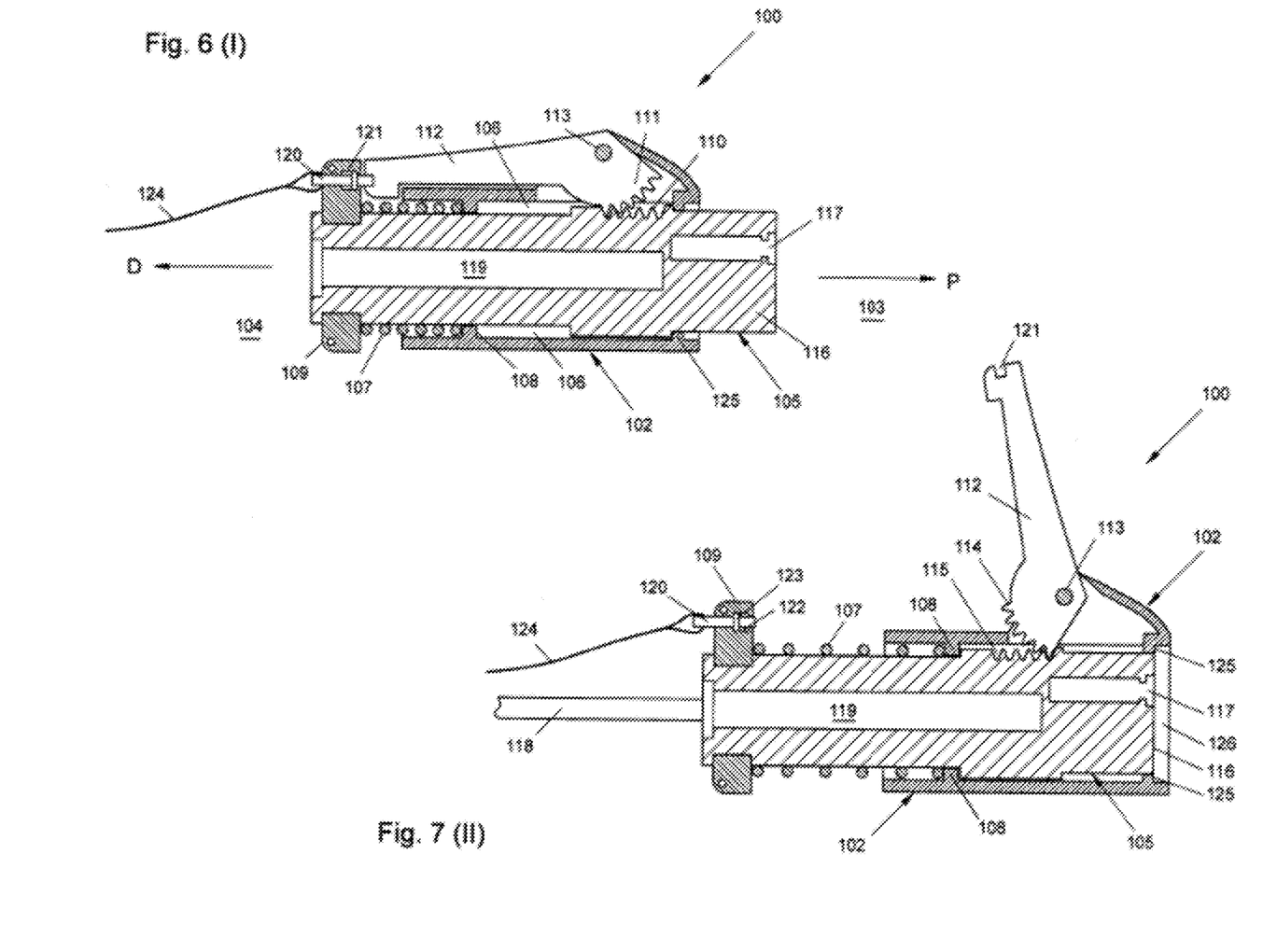
FIG. 6 shows a second embodiment of the disconnection device in connected mode.
FIG. 7 shows the device of FIG. 6 in disconnected mode.

FIGS. 6 and 7 show an alternative design and second embodiment of a power plug disconnection device in connected and disconnected modes respectively.

With reference to FIGS. 6 and 7, a power plug disconnection device 100 comprises a two-piece shell 102, only one piece of which is illustrated in the drawings, whereas the shell member closest to the viewer is removed to show the internals of the disconnection device 100. The shell 102 reaches in longitudinal direction from a forward end 103 facing the proximal direction P, in operation facing towards a socket (not shown) for a power plug, to a rear end 104 opposite to the forward end and facing the distal direction D. Within the shell 102, a pusher 105 is journaled for movement longitudinally upon release of a spring force as will be explained below. The pusher 105 may be journaled to slide on guides 106 running in the length direction for a jam-free motion within the shell 102. The pusher 105 may have a circular sectional profile substantially throughout its length. Similar to the shell 102, also the pusher 105 extends between a forward end 103 facing the proximal direction P and a rear end 104 facing the distal direction D.

A coil spring 107 is arranged in the rear end of the shell to act on the pusher. The coil spring 107 may be supported in concentric relation about a rear end portion of the pusher 105, in operative position between a radial shoulder 108 formed inside the shell 102 and a radial collar 109 arranged externally in the rear end of the pusher 105.

In the exterior of the pusher 105, a cog rack 110 is supported and extending in the longitudinal direction. The cog rack 110 may be formed integrally in the exterior of the pusher, or may alternatively be provided as a separate element attached to the outside of the pusher.

The cog rack 110 is engaged by a cog wheel 111 formed in a first end of a lever 112 which is journaled in the shell 102 for lever action about a pivot 113. The cog wheel and cog rack are continuously in geared engagement so that the lever pivots in either direction when the pusher 105 moves in the shell 102 in proximal or distal direction.

Upon manually lowering the lever 112 towards the shell 102, the cog wheel 111 drives the cog rack and pusher towards the proximal end P of the shell 102. This motion compresses the spring 107 and charges the pusher in the spring-biased position shown in FIG. 6. A cog wheel tooth 114 is arranged on the lever 112 for engagement with a correspondingly sized indentation 115 formed in the cog rack 110 for arresting the pusher 105 in the spring-biased position of FIG. 6. This design ensures a reliable engagement and arrest of the pusher in the spring-biased and charged position.

In the spring-biased position of FIG. 6, a power plug 116 is advanced in the proximal direction, past the forward end of the shell 102, for electrical connection to a mating power socket (not shown). In the disconnection device 100, the power plug (male or female) is stationary mounted in the pusher 105 to move together with the pusher in case of spring-driven disconnection from the power socket. The power plug 116 may alternatively be embedded in the pusher by moulding, and may alternatively be an integrated part of the pusher, i.e., the electric contact components such as plug-in pins or pin holes 117 may alternatively be seated in the forward end of the pusher 105 and, within the pusher, coupled to conductors of a power cable 118 which is inserted via a channel 119 that opens in the rear end of the pusher. In other words, in the second embodiment, the electric contact components are arranged in the pusher to move with the pusher 105 upon release, whereas in the first embodiment the pusher and power plug are arranged for relative movement.

A lock- and release mechanism in the form of a locking pin 120 is arranged for releasably engaging a pin seat 121 formed in the free end of the lever 112. The locking pin 120 is axially movable in a through hole 122 formed in the collar 109. A radial flange 123 on the locking pin limits the motion of the locking pin in the distal direction. A tension cord 124 reaches from the locking pin 120 to an anchoring point (not shown) on the power cable 118. The tension cord 124 pulls the locking pin from its engagement in the pin seat 121 in case of unintentional pulling of the power cable 118.

Upon release of the lever 112, the spring 107 expands to drive the pusher in a stroke-like motion in the distal direction D of the disconnection device 100. As in the previous embodiment, motion limiters and rotation limiters may be arranged to control the relative movements between the shell and the pusher. For example, in the second embodiment 100, the axial movement of the pusher 105 relative to the shell 102 is defined between the radial shoulder 108 in the distal direction and a radial shoulder 125 arranged in the proximal end of the shell 102. The shoulders 108 and 125 acting as motion limiters in either direction.

It will be realized, upon release, that the pusher 105 and the electrical components arranged in the pusher will be withdrawn into the shell 102, powered by the spring 107. Thus, whereas in the first embodiment the pusher operates as counter pressure means for disconnecting the power components, it is the shell that provides a counter pressure means in the second embodiment. In this connection it is noted that the pusher 105, upon release, is withdrawn into the shell 102 for a length sufficient to ensure that a buffer space 126 is established in the shell 102 in front of the pusher 105. The buffer space 126 provides secure circuit breakage to avoid the risk of electrical discharge between the electric contact components 117 in the pusher and corresponding components of a mating power socket upon disconnection.

The power plug disconnection device of the present invention can be modified in various ways without departing from the scope of the invention as defined in the accompanying claims. One such modification within the scope of the invention is illustrated in FIG. 8.

Figure 8:
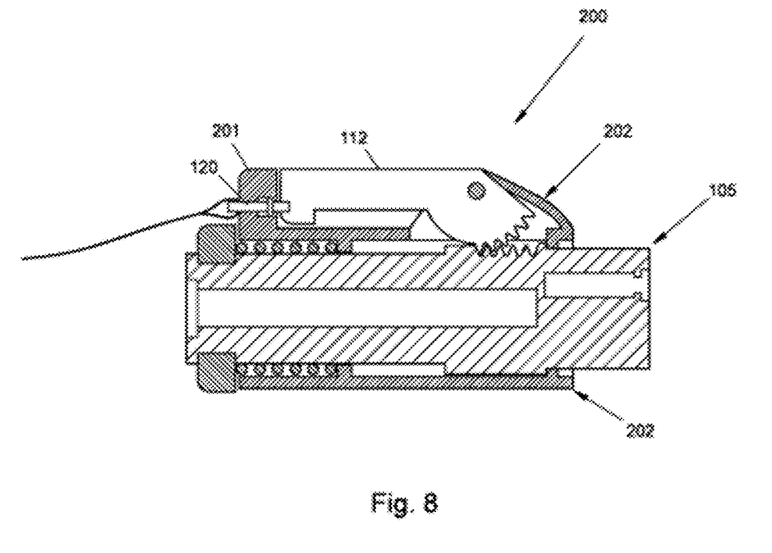
FIG. 8 shows an alternative embodiment of the disconnection device in a longitudinal sectional view.

The embodiment 200 of FIG. 8 differs from the previously disclosed embodiment 100 in that the locking pin 120 is journaled in a supporting block 201 which rises from the shell 202 in the distal end of the shell. In all other aspects, the embodiment 200 may be structurally and functionally the same as the previous embodiments.

The invention claimed is:

1. A power plug disconnection device comprising:
   a two-piece shell reaching from a forward end in use facing a proximal direction, to a rear end in use facing a distal direction, the shell pieces connectable to form a shell in surrounding relation about a pusher adapted for accommodation of electrical contact elements;
   the pusher journaled in the shell and axially movable between a withdrawn spring-biased position in the shell wherein the pusher is acted upon by a biasing force of a compressed spring, to a spring-driven position partially expelled in the proximal direction past a forward end of the shell upon release of the spring; and
   a lock- and release mechanism, in locked condition arranged to hold the pusher in a withdrawn spring-biased position, and in unlocked condition arranged to release the spring for expelling of the pusher, wherein the lock- and release mechanism engages a free end of a lever which in its opposite end is journaled on a pivot in the shell for lever action, said opposite end of the lever carrying a cog wheel in geared engagement with a cog rack arranged in an exterior of the pusher.

2. The power plug disconnection device of claim 1, comprising a coil spring arranged in operative position between a radial shoulder formed inside the shell and a radial collar arranged on the exterior of the pusher.

3. The power plug disconnection device of claim 1, wherein a cog wheel tooth is arranged on the lever for engagement with a correspondingly sized indentation formed in the cog rack for arresting the pusher in the spring-biased position.

4. The power plug disconnection device of claim 1, wherein the pusher is a hollow cylinder arranged for dismountable accommodation of a cylindrical power plug.

5. The power plug disconnection device of claim 1, wherein a power plug comprises a straight cylinder portion in a forward end of the power plug, wherein respective diameters of the pusher and the cylinder portion of the power plug are adapted for sliding the pusher over the cylinder portion.

6. The power plug disconnection device of claim 1, wherein in spring-biased position the pusher reaches past the forward end of the shell, the pusher carrying a power plug adapter ring in a protruding end of the pusher.

7. The power plug disconnection device of claim 1, wherein the lock- and release mechanism comprises a latch pivotally journaled in the free end of the lever, the latch formed with a hook formation in locked condition engaging a heel formed on the exterior of the shell.

8. The power plug disconnection device of claim 7, wherein the latch is maintained in locked condition under the bias from a spring member acting between the latch and the lever.

9. The power plug disconnection device of claim 7, comprising a tension cord in one end attached to the latch of the lock- and release mechanism, while another end of the tension cord is arranged to be anchored to a power cable at a position which ensures that, in the event of a pulling force being applied to the power cable, the tension cord becomes tightened while there is still a slack formed in the power cable.

10. The power plug disconnection device of claim 1, wherein motion limiters in the form of radial shoulders, are arranged in the shell and on the pusher and effective for limiting axial movements of the pusher within the shell.

11. The power plug disconnection device of claim 1, wherein rotation limiters in the form of axially running surfaces are arranged in the shell and on the pusher and effective for preventing rotation of the pusher within the shell.

12. The power plug disconnection device of claim 1, wherein for connecting the shell to a power plug, the shell comprises a power plug anchoring means arranged in or connectable to a rear end of the shell.

13. The power plug disconnection device of 1, comprising a bending restriction means surrounding power conductors in a rear end of a power plug, wherein the bending restriction means comprises a range of radially extended, internally distanced discs, and wherein a shell anchoring means comprises one or more teeth engaging between adjacent discs of the bending restriction means.

14. The power plug disconnection device of claim 1 comprising a safety function provided by a lid that is arranged for mounting onto a front end portion of a power plug, wherein the lid is anchored to a latch of the lock- and release mechanism by means of a wire that has a length which is adapted to tauten the wire and maintain the latch in arrested position onto the heel when the lid is mounted on the power plug.

15. A power plug disconnection device comprising:
- a two-piece shell reaching from a forward end in use facing a proximal direction, to a rear end in use facing a distal direction, the shell pieces connectable to form a shell in surrounding relation about a pusher adapted for accommodation of electrical contact elements,
- the pusher journaled in the shell, the pusher axially movable in the shell between a spring-biased forward position reaching past the forward end of the shell wherein the pusher is acted upon by a biasing force of a compressed spring, to a spring-driven position withdrawn into the shell in the distal direction upon release of the spring; and
- a lock- and release mechanism, in locked condition arranged to hold the pusher in the spring-biased position, and in unlocked condition arranged to release the spring for withdrawing of the pusher into the shell, wherein the lock- and release mechanism engages a free end of a lever which in its opposite end is journaled on a pivot in the shell for lever action, said opposite end of the lever carrying a cog wheel in geared engagement with a cog rack arranged in an exterior of the pusher.

16. The power plug disconnection device of claim 15, wherein the pusher is arranged to be withdrawn into the shell for a length sufficient to ensure that a buffer space is established in the shell, in front of the pusher.

17. The power plug disconnection device of claim 15, wherein a power plug is stationary mounted in the pusher.

18. The power plug disconnection device of claim 15, wherein electric contact components are embedded in the pusher.

19. The power plug disconnection device of claim 15, wherein a cog wheel tooth is arranged on the lever for engagement with a correspondingly sized indentation formed in the cog rack for arresting the pusher in the spring-biased position.

20. The power plug disconnection device of claim 15, wherein the lock- and release mechanism comprises a locking pin movable in a through hole formed in a radial collar formed on the shell, the locking pin in locked condition engaging a pin seat formed in the free end of the lever.

21. The power plug disconnection device of claim 15, wherein the lock- and release mechanism comprises a locking pin movable in a through hole formed in a support block formed on the shell, the locking pin in locked condition engaging a pin seat formed in the free end of the lever.

22. The power plug disconnection device of claim 15, wherein motion limiters in the form of radial shoulders are arranged in the shell and on the pusher and effective for limiting axial movements of the pusher within the shell.

23. The power plug disconnection device of claim 15, wherein rotation limiters in the form of axially running surfaces are arranged in the shell and on the pusher and effective for preventing rotation of the pusher within the shell.

* * * * *